United States Patent Office 3,340,470
Patented Sept. 5, 1967

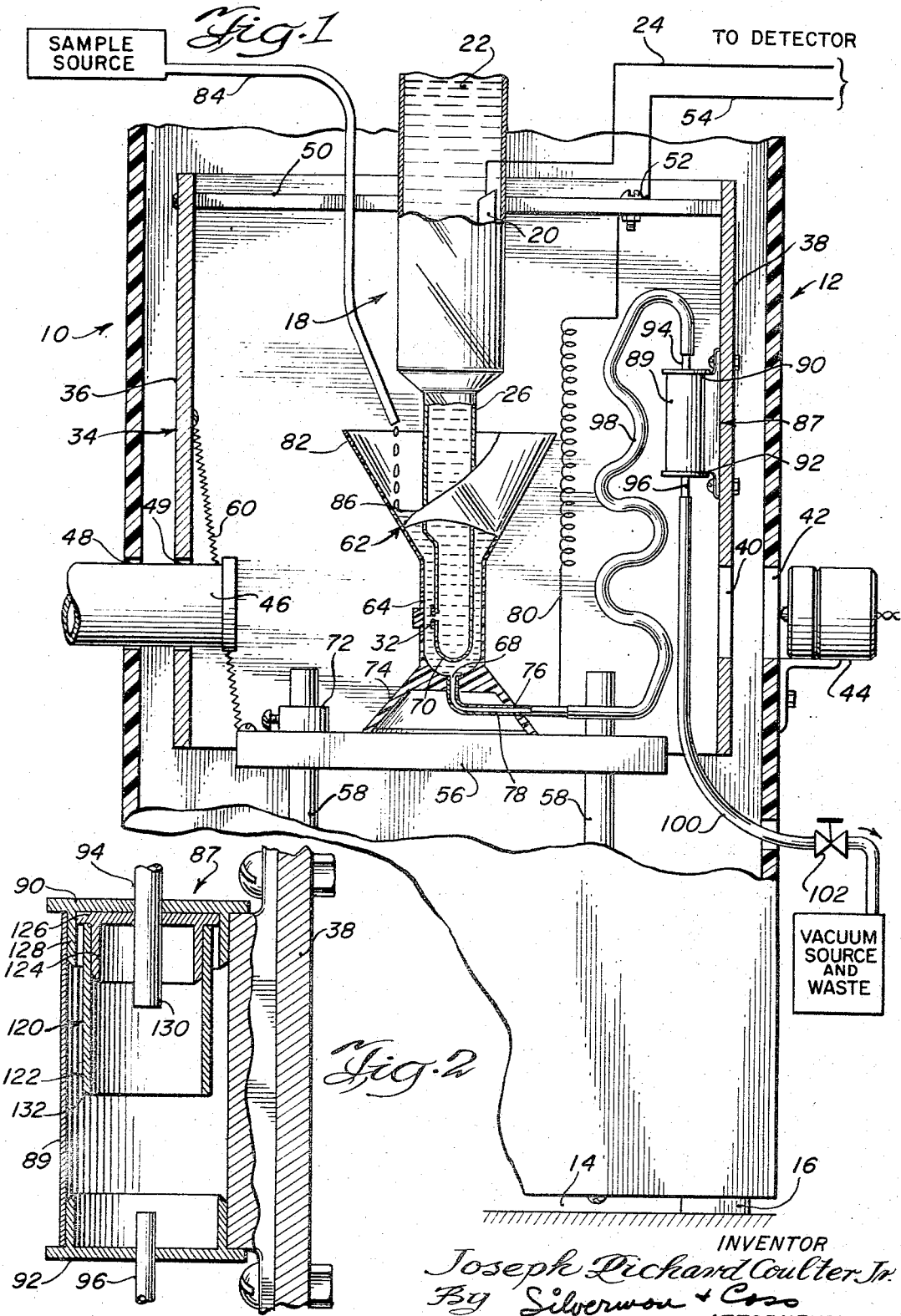

3,340,470
FLOW-THROUGH SAMPLE APPARATUS FOR USE WITH ELECTRICAL PARTICLE STUDY DEVICE
Joseph R. Coulter, Jr., Miami Springs, Fla., assignor to Coulter Electronics, Inc., Hialeah, Fla., a corporation of Illinois
Filed Sept. 23, 1964, Ser. No. 398,563
3 Claims. (Cl. 324—71)

This application is a continuation-in-part of application Ser. No. 202,624, filed June 14, 1962, and entitled, "Flow-Through Sample Apparatus for Use With Electrical Particle Study Device," now abandoned in favor of copending continuation application Ser. No. 574,250, filed Aug. 22, 1966.

This invention relates generally to apparatus for handling a suspension containing particles to be scanned and counted or sized in an electrical particle study device. More specifically, the invention is concerned with flow-through sample apparatus whereby very small quantities of the suspension are continuously passed through the apparatus.

The type of electrical particle study device with which this invention, as well as that of said co-pending application, is concerned, is known as a Coulter electronic particle counting device, although said device is additionally suitable for use in sizing and making other studies of particles. The principles of operation and construction of a Coulter electronic particle counting device is described in U.S. Patent No. 2,656,508, and the fluid metering system and scanning apparatus which has become familiarly associated with the commercially available Coulter devices known under the registered trademark "Coulter Counter" and manufactured by Coulter Electronics, Inc. of Hialeah, Fla., is described in U.S. Patent No. 2,869,078.

An important feature of a Coulter electronic particle counting device is an elongate tube which is connected into a siphon system and hence, is usually filled with a first body of liquid, such as, for example, a conducting saline solution. An electrode is carried on the interior of the tube, and the tube is disposed in a vessel such as a beaker in which another electrode is suspended. The two electrodes extend to a detecting device. The lower end of the tube has a very small aperture located in its side wall and spaced above the bottom of the tube, this aperture comprising the scanning means of the apparatus since, as the suspension from the beaker is passed through the aperture into the tube, the electrical change caused in the liquid subtended in the aperture is converted into an electrical signal which can be detected.

The sample which it is desired to study is introduced into the beaker and, according to the principles of operation of the apparatus of Patent No. 2,869,078, the suspension is metered through the aperture. The detecting device includes a source of current or voltage which is established across the aperture between the two bodies of fluid on opposite sides of the said aperture. The tube carrying the aperture is known generally as a Coulter aperture tube. Said aperture tube and the beaker are electrically insulated one from the other so that the only path for the flow of current between the two bodies of fluid must be through the aperture.

The technique of using a Coulter electronic particle counting device has become well-known and is elaborated upon in the said co-pending application to the extent that additional detailing thereof herein is believed to be unnecessary. Hereinafter, said device will be referred to as a "Coulter device."

The Coulter type devices have great utility in connection with samples which are continuously flowing through the apparatus as explained in said co-pending application. Since the principles of operation of a Coulter device call for the suspension sample to be conducting, it was found that the elongation of the conducting arm of the suspension in a vessel taking the place of the beaker was an invitation to interference and hum pickup. Such elongation, of course, is provided by conduits carrying the fluid to the sample vessel from the source of suspension and from the sample vessel. Said co-pending application described and claimed novel means for eliminating said disadvantages so that flow-through sampling could be conducted successfully. Further, asid apparatus enabled relatively small quantities of samples to be handled in a continuous flow-through system. To achieve this, there was provided a sample vessel in which a Coulter aperture tube was disposed and this vessel included a drip chamber in the outlet thereof constructed and arranged to interrupt continuous flow of fluid therein so that any possible electrical conductivity path extending from the sample in the vessel exterior of the immediate vicinity of said aperture tube was positively avoided.

However, since the drip chamber is connected at its outlet to a source of vacuum, this desired circumstance is defeated when the majority of the conducting fluid is drained from the drip chamber. The vacuum drawn causes bubbles to form on the discharge end of the entrant conduit tube which burst and splatter over the inside surface of the drip chamber to establish thereby possible conductive paths within the drip chamber.

Accordingly, this invention provides flow-through sample apparatus for use with a Coulter electronic particle counting device which embodies all of the advantages of invention of said co-pending application and in addition, includes novel baffle means for preventing spurious electrical conducting paths in the drip chamber of said apparatus under the circumstances described above.

Another object of the invention is to provide apparatus as described in which said baffle means comprises a protector or shell member supported in the drip chamber surrounding the discharge end of said entrant conduit coaxial therewith and interposed between the vertical wall of said chamber and said discharge end and spaced from said wall to prevent spurious conductive paths from being established between the entrant conduit and the drain end of the drip chamber resulting from splattering of fluid.

Other objects and advantages will occur to those skilled in the art to which this invention pertains, and the accompanying drawings of this preferred embodiment should not be construed as limiting the scope and spirit of this inventive conceptive.

In the drawings:

FIG. 1 is a generally diagrammatic sectional view through the flow-through sample apparatus embodying the invention.

FIG. 2 is an enlarged view of the drip chamber of said apparatus having said novel baffle means installed therein.

Referring now to the drawings, in FIG. 1, there is illustrated that portion of the stand of a commercially available Coulter electronic particle counting device having the same flow-through apparatus as is shown in said co-pending application, albeit, provided with said novel baffle means. The stand is illustrated in generally a diagrammatic manner and, as shown, there is a pair of side members 10 and 12 supported on a suitable base 14 that may have cushioned feet at 16. In the commercial structure, the frame members 10 and 12 are usually formed of some insulating material, such as clear plastic, so that the interior may readily be visible. Support is provided on the stand for the aperture tube 18, only the lower portion of which is shown. As conventional, the aperture tube 26 has an electrode 20 immersed in the body of fluid 22 contained within the tube, and the electrode connects by way of the lead 24 to the detector. The bottom end of the tube 26 is usually of smaller diameter as shown at 26' and normally has a flattened portion 28 upon which the scanning element or annular wafer 30 is secured. The aperture in the wafer 30 is normally not visible to the naked eye but will be referred to herein by the reference character 32.

The area in which the aperture tube 18 is suspended is normally surrounded by a metal shield 34, the side walls 36 and 38 of which are shown. Aligned openings 40 and 42 in the side plates 38 and 12 respectively enable light from a simple projector 44 to pass through the bottom end of the aperture tube 18 illuminating the aperture 32 so that a microscope, a portion of which is shown at 46, may view the aperture to inspect the same to enable the technician to know whether debris has plugged the same. The portion 46 of the microscope extends through aligned open ings 48 and 49 in the side members 10 and 36, respectively.

Conveniently, a bracing bar 50 extends between the side plates 36 and 38, said bar 50 being of insulating material and having a terminal 52 which is connected to the detector by way of the lead 54.

Ordinarily, there is a platform 56 which is adapted for vertical movement, for example, on guide rods 58, and the said platform 56 being urged upwardly by spring means, symbolically illustrated at 60.

In carrying out the Coulter method using the commercially available apparatus which has been described above, one places the sample in a simple beaker (not shown) upon the platform 56 and permits the spring 60 to pull the beaker up against the bottom end of the aperture tube 18 after which the determination is made.

In accordance with the invention herein, the bottom end of the vessel in which the sample is disposed is provided with a drain that is attached to a source of vacuum. The continuously flowing sample is introduced through the top of the vessel while continuously being drawn off through the bottom. Determinations may be made using the manometric technique described in said Coulter Patent No. 2,869,078 in which case runs are made giving a count and/or information as to size for one batch after another while the sample continuously flows through the vessel. On the other hand, where size information is all that is required or it is desired continuously to count the particles for pollution, rate, etc., there may be a continuous sucking of suspension through the aperture 32 to the interior of the aperture tube 18, while the sample is continuously flowed through the sample vessel.

Since continuous flow-through samples will usually be of very low volumes, there is illustrated in the figure a vessel designated generally 62 which is in the form of a generally cylindrical body portion 64 providing on its interior a chamber 66 which is not much greater in size and of the approximate configuration as the bottom end of the aperture tube 18. There is a drain opening at the bottom of the chamber 66 as shown at 68, and means may be provided so that when the platform 56 moves the vessel 62 upward, the bottom end 70 of the aperture tube will not close off the drain opening 68. In the particular structure shown there may be a collar 72 secured to one of the guide rods 58 to limit upward movement of the platform 56.

The vessel 62 has a suitable base or pedestal 74 which is hollow and which has a side opening 76 through which a drain tube 78 extends. The drain tube 78 is of L configuration, and it has one end inserted in the drain opening 68 and the other end extending outside the pedestal 74 through the side opening 76. This drain tube 78 is made of metal and is of capillary dimensions. There is an electrical lead 80 connected from the end of the drain tube 78 to the terminal 52 of such length as to enable the platform 56 freely to be lowered without breaking the lead 80 or limiting the movement of the platform 56.

The upper end of the vessel 62 is flared to a funnel configuration as shown at 82 to enable introduction of the sample fluid thereinto. As shown, there is a conduit 84 which leads the sample fluid to the vessel 62 and a body of such sample fluid is shown in the vessel at 86. Obviously particles in suspension in the body of fluid 86 will pass through the aperture 32 to the body of fluid 88 in the interior of the aperture tube 18.

In leading the sample fluid to the body of fluid 86 by way of the conduit 84, the rate of flow may be adjusted so that there is a continuous dripping as shown whereby the fluid in the tube 84 is never electrically connected with the body 86.

With respect to the draining of fluid from the body 86, it will be noted that there is a drip chamber designated generally 87 mounted on the interior of the side wall 38 which is intended to break up the flow of discharge liquid to prevent electrical connection between the said body of fluid 86 and the discharge fluid.

The drip chamber 87 consists of a tubular member 89 of insulating material having top and bottom plugs 90 and 92 through which short conduits 94 and 96, respectively, extend. The conduit 94 connects by way of a flexible tube 98 to the drain tube 78 and is of such length and configuration as to enable free movement of the platform 56 up and down. The bottom conduit 96 is connected to a pipe 100 which, in turn, extends to a source of vacuum so identified and a waste container through the valve 102. When the vacuum is permitted to draw the fluid from the body of fluid in vessel 62, it will pass from the tube 98 through the entrant conduit 94, the drip chamber 87 and into the tubing 100 through conduit 96. The size of the passageways in said tubing and conduits is such that the fluid will be dripping by discrete drops through the drip chamber 87, and thereby, there will be no electrical connection between that fluid which is within the tube 98 and that fluid which is in the tube 100.

Throughout almost the complete operating cycle of the scanner mechanism, proper adjustment of the flow-through sample to prevent extraneous signals from being generated by creation of electrical flow paths in the drip chamber is a relatively simple matter. However, towards the end of the operating cycle when the majority of the conducting solution has ben drained from vessel 62 via tubes 78 and 98, bubbles form at the end of entrant conduit 94 into drip chamber 87.

As the effectiveness of the vacuum being drawn through valve 102 and conduit 100 decreases due to adverse pressure gradients, discrete drops are not as readily formed, and the above mentioned bubbles form instead. These bubbles form at the discharge end of entrant conduit 94 and may burst and splatter over the inside wall of the drip chamber when they are drawn into said chamber. This splattering action provides spurious conductive electric paths along the inner walls of the chamber since the very principle of operation of the Coulter particle counting device requires the suspension sample to be electrically conductive. The means for preventing such spurious electrically conductive paths in the drip chamber is designated generally by the reference character 120.

Referring to FIG. 2, the means 120 comprises a baffle in the form of a tubular shell 122 oriented in a direction substantially parallel to the vertical axis of the drip chamber and substantially concentric therewith. The shell 122 is constructed of any suitable non-conductive or insulating material such as plastic or glass. The shell 122 is of cylindrical configuration and is wedged over the end skirt 124 depending from the transverse wall 126 of a second cap frictionally engaged in the skirt 128 of the cap 90. The entrant tube 94 extends through suitably aligned openings in the transverse end walls of said caps. The diameter of the shell 122 is less than that of the member 89 sufficiently to prevent electrical flow paths between itself and the tube 89. Also, the axial length of the shell 122 is selected for the same purpose so that upon bursting of the bubbles at the discharge end 130 of the tube 94, the fluid will drip from end 132 without establishing any spurious electrical paths to the plug 92. Note that end 132 is spaced from said plug 92 sufficiently for this purpose.

It should be mentioned in passing that the voltage encountered in using said described Coulter electronic particle counting apparatus are often high enough to cause electrical shock. The invention herein likewise prevents electrical shock to anyone handling the various parts of such apparatus by insulating the sample vessel 62 from either the incoming or outgoing liquid.

It is believed that the invention should be fully understood without further explanation, and it is pointed out that considerable variation may be made without departing from the spirit or scope of the invention as defined in the appended claims.

What it is desired to secure by Letters Patent of the United States is:

1. A flow-through system for use with a Coulter type electronic particle counting device which comprises a vessel of insulating material adapted to receive the aperture tube of said device therein, means for dripping a controlled flow fluid sample suspension from a source thereof into the top of said vessel, means for controllably draining the sample suspension from the bottom of the vessel and including a source of vacuum and a drip chamber serially arranged between the source of vacuum and said vessel to break up the flow of suspension emerging from the vessel into discrete drops, an entrant tube having a discharge end in said chamber, and baffle means disposed within the said chamber to prevent establishment of spurious electrical conductive paths in the drip chamber due to spattering of fluid from said discharge end upon the walls of the said chamber, said baffle means being interposed between the said discharge end and said chamber walls.

2. A system as claimed in claim 1 in which said baffle means is oriented in a direction following the vertical axis of the drip chamber.

3. A system as claimed in claim 1 in which said baffle means comprises a shell of electrical insulating material supported in said chamber, a fluid entrant tube having a discharge end in said chamber, said shell surrounding said discharge end and being substantially coaxial therewith spaced from said chamber wall.

References Cited

UNITED STATES PATENTS

| | | | |
|---|---|---|---|
| 3,165,692 | 1/1965 | Isreeli et al. | 324—71 |
| 3,165,693 | 1/1965 | Isreeli et al. | 324—71 |

RUDOLPH V. ROLINEC, *Primary Examiner.*

WALTER L. CARLSON, *Examiner.*

C. F. ROBERTS, *Assistant Examiner.*